Patented Apr. 29, 1952

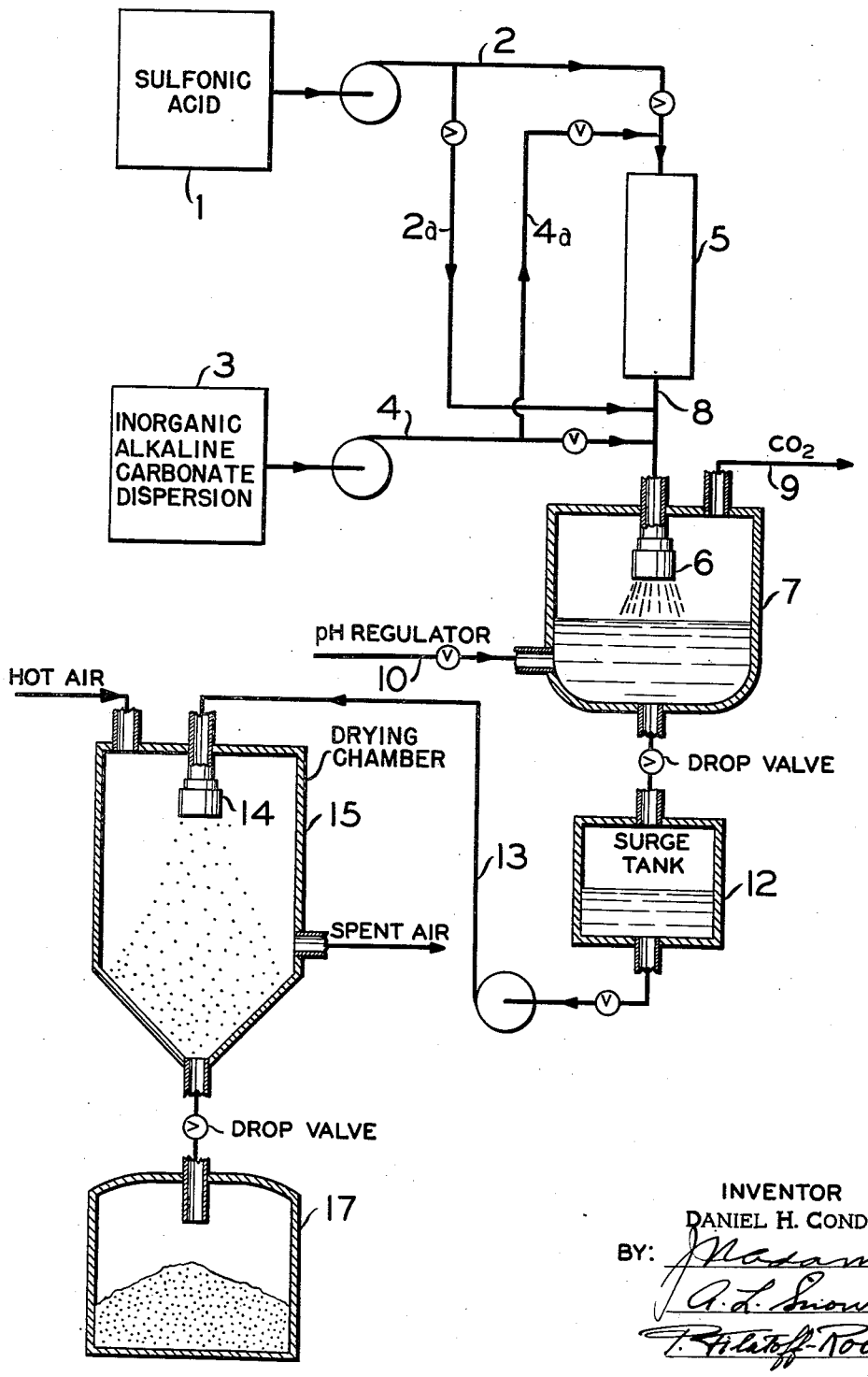

2,594,875

UNITED STATES PATENT OFFICE 2,594,875

PROCESS OF NEUTRALIZING AND SPRAY DRYING A SOLUTION OF ORGANIC SULFONIC ACID

Daniel H. Condit, Lafayette, Calif., assignor to California Research Corporation, San Francisco, Calif., a corporation of Delaware Application April 30, 1948, Serial No. 24,404

16 Claims. (Cl. 252—161)

This invention relates to a continuous process of neutralizing organic sulfonic acids with inorganic alkaline carbonates and recovering the neutralization products in the form of dry particles relatively free from dust, or, if desired, as slurries.

The term "inorganic alkaline carbonates" as used in the following specification and claims refers to two classes of carbonates: (1) water-soluble carbonates, e. g., the alkali metal carbonates exemplified by sodium and potassium carbonates, ammonium carbonate also being included in this class; and (2) carbonates of alkaline earth metals, e. g., of magnesium and calcium. In other words, the term "inorganic alkaline carbonates" is used herein to designate carbonic acid salts of monovalent cations, such as sodium, potassium and ammonium, and those of bivalent cations, such as magnesium and calcium.

The various organic sulfonic acids, such as alkyl sulfuric, alkyl aryl sulfonic, and alkyl sulfonic acids, as a general rule, are characterized by their pronounced surface-active properties which render them, as well as their alkali metal and alkaline earth metal salts, for instance, sodium or magnesium salts, very valuable in a large number of compositions and, particularly, as active ingredients for wetting and/or detergent agents. Owing to their high surface activity, however, these acids and their derivatives possess the tendency to form considerable foam when mixed or stirred with water. Thus, when such an oxy-acid of sulfur, e. g., an alkyl aryl sulfonic acid, is neutralized with an inorganic alkaline carbonate, for example, with an aqueous solution of sodium carbonate, a large amount of stable foam is produced with entraps and tends to retain the carbon dioxide gas evolved in the neutralization and, consequently, interferes with the recovery of the neutralized product and renders this recovery onerous and costly.

A method commonly used to avoid foaming is to neutralize with sodium hydroxide. This method has a number of disadvantages including production of objectionable color bodies by reactions which are not understood and increased cost of product resulting from consumption of the more expensive caustic alkali.

It is an object of the present invention to provide a new process of continuously neutralizing organic sulfonic acids with aqueous dispersions of inorganic alkaline carbonates.

A particular object of the invention is to provide a continuous process of neutralizing organic oxy-acids of sulfur with aqueous dispersions of inorganic alkaline carbonates while alleviating dusting in the dried neutralization product.

A further object is to provide a neutralization method which minimizes formation of undesirable color bodies.

A more specific object of this invention is to provide a continuous process of neutralizing organic sulfonic acids with aqueous dispersions of inorganic alkaline carbonates and producing from the incipient or partially-formed product foam a neutralized, defoamed slurry, particularly adapted for conversion to a dry, relatively non-dusting, particulate solid.

Another specific object of the invention is to provide a continuous process of neutralizing organic sulfonic acids with aqueous dispersions of inorganic alkaline carbonates and producing a neutralized, defoamed slurry characterized by a minimum content of occluded carbon dioxide and air and by a good color.

An additional object of this invention is to provide a continuous process of neutralizing organic sulfonic acids with aqueous dispersions of inorganic alkaline carbonates and recovering the neutralization product in the form of uniform particles or beads essentially free from dust, and characterized by improved color and odor.

Other objects will become apparent from the description which follows.

Briefly stated, the process of the invention involves effecting the neutralization of oxy-acids of sulfur with aqueous dispersions of inorganic alkaline carbonates in a confined space, while retaining the autogenous pressure of the carbon dioxide evolved in the course of neutralization, spraying the resulting polyphase neutralization mixture of gas and liquid into a liquid collecting chamber to release the carbon dioxide gas, collecting the neutralized product in the form of a flowable, defoamed, dense, liquid slurry, and forming a dry, particulate, substantially dust-free solid by drying the aforesaid slurry.

When, in accordance with the invention, a feed stream containing an oxy-acid of sulfur is contacted in a confined space with a feed stream of an aqueous solution of an alkali metal carbonate, or with an aqueous suspension or slurry of an alkaline earth metal carbonate, as the case may be, the resulting carbon dioxide gas exerts autogenous pressure developed within the confined neutralization space. The development of this autogenous pressure, the velocity of the incoming feed streams, and the resulting turbulence contribute to a more thorough mixing of the reactants and a more complete neutralization of the acid. The autogenous pressure, together with any additional extraneous pressure applied to the neutralization zone, is released and carbon dioxide is disengaged from the liquid by passing the polyphase neutralization mixture of liquid and gas through a pressure-type spray nozzle into a liquid-collecting chamber.

Surprisingly, the carbon dioxide is quickly disengaged from the liquid in the spraying operation, and entrapment in a stable foam which normally forms is thereby avoided.

The intermediate slurry product is collected at the bottom of the collecting chamber and the slurry so collected is sufficiently foam-free to be dried promptly. Although drum-drying of the slurry product is not precluded, spray-drying is preferred to yield a bead-type product substantially free of dust. For this purpose, the slurry is passed into a spray-drying chamber traversed by a stream of hot air or gas, with inlet temperatures being from about 300° to about 1000° F. and exhaust temperatures being from about 150° to about 350° F. The final product, in the form of dry, relatively uniform, strong, non-dusting, though finely-divided, globular particles or beads, settles at the bottom of the drying chamber and may be thence withdrawn for storage or shipment.

As mentioned hereinbefore, the inorganic alkaline carbonates suitable for the neutralization of organic oxy-acids of sulfur in accordance with the process of the present invention are the water-soluble ammonium and alkali metal carbonates, such as sodium carbonate and potassium carbonate, and alkaline earth metal carbonates, such as magnesium carbonate and calcium carbonate. Sodium and potassium carbonates are readily applicable for the neutralization of oxy-acids of sulfur in the form of aqueous solutions. In the case of magnesium carbonate and calcium carbonate, the finely-divided carbonates are dispersed in water to form a suspension or a slurry of suitable flowability.

Although it has been pointed out that the process is operative with a number of inorganic carbonates, for the sake of brevity, the following description of the process, as illustrated by the flow diagram in the attached drawing and the experimental results presented thereafter, will be given with reference to a representative carbonate, namely, sodium carbonate in the form of an aqueous solution.

In the diagram an organic oxy-acid of hexavalent sulfur is fed from vessel 1 through line 2 and is met and commingled with a stream of an aqueous solution of sodium carbonate supplied from vessel 3 to vessel 4. The mixing of the two feed streams takes place, for instance, in a confined space which includes flow mixer 5, and autogenous pressure is developed by the generation of carbon dioxide in the neutralization reaction mixture prior to the admission of this mixture into spray nozzle 6. Pressure on the mixture is released by spraying into a collecting chamber 7. Flow mixer 5 is so designed as to insure adequate mixing. Such a flow mixer may, for instance, consist of a succession of constricted orifices in the flow line, with the pressure varying from 25 to 100 pounds per square inch at the point of leaving spray nozzle 6. In some installations, adequate mixing and neutralization of oxy-acids of sulfur may be effected in pressure line 8, which immediately precedes the nozzle 6, and in the nozzle 6 itself, while omitting the flow mixer from the system by the manipulation of appropriate valves located on lines 2, 2a, 4 and 4a, as shown in the diagram. As mentioned before, the neutralization product in an incipient or partially-foamed state resulting from the reaction of the oxy-acid of sulfur and sodium carbonate is then sprayed into collecting chamber 7 through pressure nozzle 6 to disengage and release the carbon dioxide generated by the neutralization reaction. Droplets of neutralized product release the carbon dioxide, fall down, settle, and agglomerate as an essentially defoamed, liquid slurry at the bottom of chamber 7. Desirably, a stirrer is provided at the bottom of chamber 7 to promote further release of additional carbon dioxide and any air which may be entrained. The disengaged carbon dioxide gas leaves the collecting chamber through exhaust outlet 9 for its eventual disposal or utilization. From collecting chamber 7 the slurry is passed by means of a drop valve into surge tank 12 and thence is fed through line 13 to spray drier 15. As shown in the drawing, the defoamed, liquid slurry is sprayed from nozzle 14 and contacted with a stream of hot air or drying gas in drying chamber 15. The dry, particulate product is withdrawn from drying chamber 15 by opening the drop valve and discharging the dry product into storage bin 17.

Suitable fillers and extenders may be added to the neutralization product prior to the spraying thereof into collecting chamber 7, or may be incorporated in the neutralized liquid slurry following its spraying. In this latter case, conventional stirring means will be provided in the liquid-collecting chamber 7 or in surge tank 12.

In the preparation of sodium carbonate neutralization feed, it is preferred to dissolve sodium carbonate in hot water to increase solubility, desirably near the temperature of about 96° F., which corresponds to the maximum of solubility of sodium carbonate in water, and thus to reduce the amount of added water and the energy which is eventually required for the removal of water from the product. When desired, a slurry of the carbonate may be utilized to further reduce the amount of water to be removed from the neutralization mixture. The temperature of the stream of oxy-acid of sulfur arriving to the neutralization zone is not critical, and may be set at any convenient figure. The neutralization reaction is completed to a pH from about 5.0 to about 10.0 and even higher, depending upon the specifications of the ultimately desired product. Ordinarily, the product obtained in this manner will contain some carbonate, mostly in the form of sodium bicarbonate. Should the presence of these admixtures be objectionable, the recommended procedure is to effect the reaction to a pH of about 5.0 or less and thereby to disengage carbon dioxide, and subsequently to trim the resultant slurry with sufficient sodium hydroxide or other suitable pH regulator, as shown at 10 in the drawing, to bring the pH value to a desired higher figure.

The operation of the present process is further illustrated by several test runs, the results of which are given in Table I below. A mixture of the indicated amounts of alkyl benzene sulfonic acid together with excess sulfuric acid, obtained by sulfonating alkyl benzenes having from 12 to 18 carbon atoms in the alkyl chain, and an aqueous solution of sodium carbonate were commingled so as to cause the neutralization of the acid, and the resulting polyphase mixture was sprayed into the liquid-collecting chamber. Operating conditions and slurry analyses for a series of ten runs are given in Tables I and II.

about 31.8% by weight free sulfuric acid, and the remainder water. The carbonate solution contained about 25% by weight $Na_2CO_3$.

TABLE I
Operating conditions

| Run No. | Temperature, ° F. | | | Pressure—Lbs./sq. in. | | | Feed Rate | |
|---|---|---|---|---|---|---|---|---|
| | $Na_2CO_3$ Sol'n. | Sulfonic Acid Sol'n. | Slurry | 1st Orifice | 2nd Orifice | Nozzle | Lbs./Hr. Sulfonic Acid [1] | $Na_2CO_3$ [2] |
| 1 | 100 | 90 | 147 | 87 | 85 | 80 | 17.8 | 8.77 |
| 2 | 100 | 98 | 140 | 50+ | 50— | 40 | 15.7 | 12.7 |
| 3 | 108 | 100 | 140 | 85 | 83 | 77 | 22.0 | 17.4 |
| 4 | 95 | 108 | 135 | 90 | 87 | 80 | 25.0 | 17.4 |
| 5 | 110 | 95 | | 90 | 85 | 80 | 22.0 | 16.2 |
| 6 | 98 | 118 | | 80 | 75 | 80 | 25.0 | 16.7 |
| 7 | 114 | 97 | | 100 | 90 | 85 | 25.9 | 16.7 |
| 8 | 98 | 117 | 156 | 110 | | 95 | 56.5 | 22.4 |
| 9 | 110 | 110 | 157 | 80 | | 70 | 73.1 | 20.0 |
| 10 | 110 | 110 | 140 | 85 | | 75 | 36.5 | 20.0 |

[1] Weight of acid based on calculated wt./gal. of 9.5 lbs.
[2] Weight of dry $Na_2CO_3$ in 25% solution.

TABLE II
Slurry analysis

| Run No. | pH | Color | Excess Carbonate | Per Cent Unsulfonated Oil | Per Cent $H_2O$ | Slurry Density,[1] Lbs./Gal. |
|---|---|---|---|---|---|---|
| 1 | 8.3 | 2 | 1.9 | 0.6 | 50.8 | |
| 2 | 8.6 | 2 | 4.6 | 0.7 | 55.0 | 10.3 |
| 3 | 8.5 | 1 | 4.9 | 0.57 | 56.9 | 10.2 |
| 4 | 8.5 | 1 | 4.4 | 0.6 | 56.0 | 10.1 |
| 5 | 8.8 | 1 | 6.4 | 0.52 | 56.5 | 10.0 |
| 6 | 8.8 | 2 | 6.2 | 0.37 | 56.5 | |
| 7 | 8.7 | 1 | 6.8 | 0.42 | 56.4 | |
| 8 | 2.4 | 1 | 0 | 0.49 | 51.4 | |
| 9 | 2.2 | 1 | 0 | 0.65 | 48.0 | |
| 10 | 8.4 | 1 | 1.6 | 0.49 | 54.0 | |

[1] After slurry agitation or intermittent vacuum.

Results of larger scale runs are set forth in Table III.

TABLE III
Typical semi-commercial runs

| Run | 11 | 12 | 13 | 14 | 15 |
|---|---|---|---|---|---|
| Pressures, Lb./sq. in.: | | | | | |
| Acid in | 80 | 100 | 70–100 | 69 | 100 |
| $Na_2CO_3$ in | 70 | 100 | 60–95 | 77 | 80 |
| Nozzle | 42 | 74 | 30–60 | 33 | 8 |
| Temperatures, ° F.: | | | | | |
| Acid | 106 | 110 | 110 | 95 | 110 |
| $Na_2CO_3$ | 97 | 86 | 91 | 100 | 100 |
| Nozzle | 145 | 149 | 151 | 150 | 145 |
| Rates: | | | | | |
| $Na_2CO_3$ Gal./hr | 78.5 | 127 | 99 | 264 | 360 |
| Detergent Prod. #/hr | 616 | 1,100 | 887 | 2,180 | 3,320 |
| Basis, Dry 60% (Calculated): | | | | | |
| pH | 8.6–8.7 | | 7.8 | 7.2 | 8.0 |

Analysis of the slurry from run 12 gave the following results:

Run _____ 12
Slurry analysis:
    Sodium sulfonate _____ 21.7
    Sodium carbonate _____ 0.7
    Sodium sulfate _____ 14.7
    Petroleum ether soluble _____ 0.2
    Water _____ 62.0

In all of the foregoing runs the sulfonic acid was an aqueous solution containing about 67.0% by weight of the alkyl benzene sulfonic acid, The effect of the pH of the slurry on carbonate content, for instance, is present largely as sodium bicarbonate and is illustrated by the following:

| Slurry pH | Carbonate Content—Per cent by Weight (Calculated as $Na_2CO_3$) |
|---|---|
| 5 | Trace |
| 6 | 0.0 |
| 7 | 0.2 |
| 8 | 1.1 |
| 8.5 | 3.3 |
| 9.0 | 7.4 |
| 9.5 | 13.0 |

It has been discovered that in the process of this invention carbon dioxide is disengaged from the sprayed slurry to yield a relatively dense, foam-free liquid when the pH of the slurry is 8 or higher. When neutralization is carried to a pH lower than 8, for example, 5 to 6, disengagement of residual quantities of carbon dioxide necessary to a liquid slurry of high density becomes more difficult, although the slurry is essentially defoamed and is relatively free of the stable voluminous foam which would normally be formed in the absence of the spraying treatment. In order to accelerate release of the residual carbon dioxide in the agglomerated slurry from the spraying operation, mild mechanical agitation is desirable or, alternatively, sonic or ultrasonic vibrations may be utilized. Data to date indicate that vibrations of from about 350 to 400 cycles per second are most effective.

The present continuous process of neutralization and recovery of dry, dust-free product in two stages, first as a slurry, and finally in particulate form, secures important advantages over prior processes. The process yields a white product as distinguished from light tan or slightly yellow products heretofore obtained in commercial scale processes with caustic neutralization. The invention enables one to eliminate, or at least substantially reduce, the dust nuisance so annoying in handling the neutralized dried particles. Furthermore, it permits of securing a much stronger and denser bead instead of the product abounding in fines obtained by spraying the carbonate neutralization mixture directly into a drier. Additionally, the product possesses an improved odor. These advantages, coupled with the avoidance of excessive foam and the simplicity of equipment and operating techniques, render the present process particularly useful.

Another distinct advantage of the process of this invention is that the defoamed slurry is characterized by freedom from gelation at temperatures of 140° F. and higher. In contrast thereto slurries obtained by caustic neutralization set up into gelled structures which are exceedingly difficult to handle when heated to temperatures of 140° F. or above. The phenomenon responsible for this outstanding advantage of the slurries produced by the present invention is not understood but is none the less real.

As a result of the foregoing characteristics, the neutralized product may be recovered directly from the collecting chamber in the form of a slurry, in which form it is more easily handled for the purpose of compounding with detergent additives or storage and shipment. Heretofore, in the manufacture of slurries of neutralized oxy-acids of sulfur by neutralization with caustic alkali, it has been necessary to circulate the neutralized slurries through a series of external heat exchangers to avoid excessive neutralization temperatures. However, this procedure results in occlusion of considerable air and causes swelling of the slurry, which is pumped to the tank cars or shipping containers at an apparent density of about 6.5 to 7.5 pounds per gallon. The occluded air is released only very slowly, but eventually this air is released by the slurry product, and the density of de-aerated slurry reaches the range of 9.5 to 10.0 pounds per gallon. Thus, long storage has been required (which is costly) or unnecessary freight paid, owing to the presence of air in the slurry as originally shipped. The process of the present invention substantially reduces this unnecessary expense. The phenomenon is not understood, but in the process occluded carbon dioxide is released more promptly than occluded air and without prolonged storage prior to shipment. For example, in the case of alkyl benzene sulfonate product of the aforementioned test runs, densities in the range from 9.0 to 9.5 pounds per gallon can be attained on removal from surge tank 12 when neutralization is carried to a pH of about 8.0 or higher. The increased apparent density permits of increasing the actual number of pounds of the slurry which can be charged per tank car or container, thereby greatly reducing handling time and shipping costs. Additionally, the application of the process of the present invention permits the manufacture of a slurry product of a much lower water content than has been heretofore feasible and thus increases the capacity of spray-drying equipment. This is made possible by the fact that it is unnecessary to remove heat of neutralization by circulation through heat exchangers, and avoidance of this requirement permits production of a more viscous neutralization slurry.

It will be realized by those skilled in the art that some of the details of operating technique and some of the conditions, specific to the application of aqueous sodium carbonate and described hereinbefore with reference to the neutralization or organic oxy-acids of sulfur therewith, may be modified in each particular case, depending on the kind of alkaline carbonate involved.

Thus, in the case of an alkaline earth metal carbonate, such as magnesium carbonate, longer mixing periods may be required to secure adequate commingling with the oxy-acids of sulfur and their neutralization by the suspensions of finely-divided magnesium carbonate. The same will be true of calcium carbonate. Furthermore, when applying calcium carbonate for the neutralization of an organic oxy-acid of sulfur containing an admixture of sulfuric acid, such as the aforementioned sulfonation reaction mixture of alkyl benzene sulfonic and sulfuric acids, one may decrease formation of insoluble calcium sulfate by first diluting the sulfonation reaction mixture with water to stratify the sulfuric acid, decanting or otherwise withdrawing the same, and only then commingling the feed streams of the sulfonic acid layer and of the slurry of finely-divided calcium carbonate in accordance with the process of the invention.

Ammonium carbonate may likewise be used in aqueous solution to neutralize the organic oxy-acids of sulfur in accordance with the invention and to form a slurry of the neutralized product. In view of the relatively lower stability of ammonium salts, lower drying temperatures are desirable to minimize any tendency to decompose.

The present invention is not limited to any particular organic oxy-acid of sulfur but, on the contrary, is applicable to all types of surface-active organic oxy-acids of sulfur, whether used alone and in pure state or in aqueous solution, or mixed with other oxy-acids of sulfur. In general, organic oxy-acids of hexavalent sulfur are preferred. In particular, alkyl aryl sulfonic acids such as are obtained by sulfonating a mixture of alkyl aryl benzene with 12 to 18 carbon atoms, and preferably with 12 to 15 carbon atoms, in the alkyl chain, and which ordinarily may contain a significant admixture of unreacted sulfuric acid, constitute a very suitable material for the application of the present process. The acid or acids to be neutralized may also be combined with various builders such as suitable sulfonates, silicates, phosphates, or their corresponding acids; various additives such as suitable inorganic salts of high molecular weight carboxylic acids, e. g., inorganic alkaline salts of carboxymethyl cellulose or oxidized cellulose, as well as defoaming agents, and suitable auxiliary detergents. Likewise, the foregoing may be incorporated in the neutralized acid and defoamed slurry prior to its drying, as pointed out hereinabove.

The dry particulate product obtained by the integrated continuous process of the present invention which involves neutralizing an oxy-acid of sulfur with inorganic alkaline carbonates, disengaging resultant carbon dioxide by spraying the neutralized product in a first stage, agglomerating the spray particles to form a liquid slurry, and spray-drying this resulting slurry in the second stage into solid particles imparts a number of advantages to the resulting particulate, dry product. It has been noted that, in addition to securing a substantially non-dusting, particulate bead product, the color of the dry product is considerably improved as compared with similar products obtained by batch neutralization, and, in the case of alkyl benzene sulfonate type products, the objectionable yellowish cast is practically non-existent. Likewise, the characteristic odor of sulfonate detergent is considerably reduced.

In conclusion, it must be understood that the invention is not limited to the operating details shown in the flow diagram and the examples of the specification and may embrace any modification thereof, provided these modifications are included within the definitions of the appended claims.

I claim:

1. A continuous process for the manufacture of a particulate, substantially dust-free surface-active product of neutralization of an organic sulfonic acid, which comprises neutralizing a liquid feed stream containing an organic sulfonic acid by mixing said feed stream with an aqueous dispersion of an inorganic alkaline carbonate in a confined zone while retaining carbon dioxide gas produced by neutralization of said organic sulfonic acid in said confined zone to form a polyphase mixture of said carbon dioxide gas and of an aqueous liquid containing the salt resulting from the neutralization of said organic sulfonic acid; spraying said polyphase mixture into a liquid-collecting chamber by utilizing the force of the autogenous pressure of carbon dioxide gas present in said mixture to effect the release of said carbon dioxide gas; collecting the spray at the bottom of said chamber in the form of an agglomerated, liquid, essentially defoamed slurry; spray-drying said liquid slurry; and recovering solid, relatively uniform, dust-free particles of said salt of organic sulfonic acid.

2. A continuous process for the manufacture of particulate surface-active product of neutralization of an alkyl aryl sulfonic acid, which comprises neutralizing a liquid feed stream containing said acid, normally tending to form a gas-retaining stable foam, by mixing said feed stream with a feed stream of an aqueous dispersion of an inorganic alkaline carbonate in a confined space, while retaining carbon dioxide gas produced by neutralization of said acid in said confined space, to form a polyphase mixture which comprises said gas and aqueous liquid, containing the salt resulting from the neutralization of said alkyl aryl sulfonic acid by said inorganic alkaline carbonate, spraying said polyphase mixture into a liquid-collecting chamber by utilizing the force of the autogenous pressure of carbon dioxide gas present in said mixture to effect the release of said gas, collecting the sprayed particles at the bottom of said chamber in the form of an agglomerated, liquid, essentially defoamed slurry, drying said liquid slurry, and recovering solid, relatively uniform dust-free particles of said salt of said alkyl aryl sulfonic acid.

3. A continuous process for the manufacture of particulate, surface-active product of neutralization of an alkyl benzene sulfonic acid containing from 12 to 18 carbon atoms in the alkyl chain, which comprises neutralizing a liquid feed containing said acid, normally tending to form a gas-retaining stable foam, by mixing said feed with a feed of an aqueous dispersion of an inorganic alkaline carbonate in a confined zone, while retaining carbon dioxide produced by neutralization of said alkyl benzene sulfonic acid in said confined zone, to form a polyphase mixture containing carbon dioxide and aqueous liquid, having a pH equal to at least 5.0 and containing the salt resulting from the neutralization of said alkyl benzene sulfonic acid by said inorganic alkaline carbonate, spraying said polyphase mixture into a liquid-collecting chamber by utilizing the force of the autogenous pressure of carbon dioxide gas present in said mixture to effect the release of the carbon dioxide gas of neutralization, collecting the sprayed particles at the bottom of said chamber in the form of an agglomerated, liquid, essentially defoamed slurry, drying said liquid slurry by spraying it into a stream of hot air at a temperature of at least about 300° F., and recovering solid, relatively uniform, dust-free particles of said salt of said alkyl benzene sulfonic acid.

4. A continuous process for the manufacture of particulate, surface-active product of neutralization of an alkyl benzene sulfonic acid containing from 12 to 18 carbon atoms in the alkyl chain, which comprises neutralizing a liquid feed containing said acid, normally tending to form a gas-retaining stable foam, by mixing said feed with the feed of an aqueous solution of sodium carbonate in a confined zone, while retaining carbon dioxide produced by neutralization of said alkyl benzene sulfonic acid in said confined zone, to form a polyphase mixture containing carbon dioxide and aqueous liquid, containing sodium alkyl benzene carbonate resulting from the neutralization of said alkyl benzene sulfonic acid by sodium carbonate, spraying said polyphase mixture into a liquid-collecting chamber by utilizing the force of the autogenous pressure of carbon dioxide gas present in said mixture to effect the release of carbon dioxide gas of neutralization, collecting the sprayed particles at the bottom of said chamber in the form of an agglomerated, liquid, essentially defoamed slurry, drying said liquid slurry by spraying it into a stream of hot air and recovering solid, relatively uniform, dust-free particles of said sodium alkyl benzene sulfonate.

5. A continuous process for the manufacture of particulate, surface-active product of neutralization of an alkyl benzene sulfonic acid containing from 12 to 18 carbon atoms in the alkyl chain, which comprises neutralizing a liquid feed containing said acid, normally tending to form a gas-retaining stable foam, by mixing said feed with a feed of an aqueous suspension of magnesium carbonate in a confined zone, while retaining carbon dioxide produced by neutralization of said alkyl benzene sulfonic acid in said confined zone, to form a polyphase mixture containing carbon dioxide and aqueous liquid, containing magnesium alkyl benzene sulfonate resulting from the neutralization of said alkyl benzene sulfonic acid by magnesium carbonate, spraying said polyphase mixture into a liquid-collecting chamber to effect the release of said carbon dioxide gas of neutralization, collecting the sprayed particles at the bottom of said chamber in the form of an agglomerated, liquid, essentially defoamed slurry, drying said liquid slurry by spraying it into a stream of hot air, and recovering solid, relatively uniform, dust-free particles of said magnesium alkyl benzene sulfonate.

6. A continuous process of producing surface-active salts of alkyl aryl sulfonic acids, which comprises neutralizing a liquid feed stream containing an alkyl aryl sulfonic acid, normally tending to form a gas-retaining stable foam, by mixing said feed stream with a stream of an aqueous dispersion of an inorganic alkaline carbonate in a confined space, while retaining carbon dioxide gas produced by the neutralization of said acid in said confined space to form a polyphase mixture which contains said gas and aqueous liquid, containing the salt resulting from the neutralization of said alkyl aryl sulfonic acid by said inorganic alkaline carbonate, spraying said polyphase mixture into a liquid-collecting chamber by utilizing the force of the autogenous pressure of carbon dioxide gas present in said mixture to effect the release of said carbon dioxide gas of neutralization, and collecting the sprayed particles at the bottom of said chamber in the form of an agglomerated, liquid, essentially defoamed slurry.

7. A continuous process of producing a sodium salt of alkyl benzene sulfonic acid, which comprises neutralizing a liquid feed stream containing an alkyl benzene sulfonic acid, normally tending to form a gas-retaining stable foam, by mixing said feed stream with a stream of an aqueous solution of sodium carbonate in a confined space, while retaining carbon dioxide gas produced by the neutralization of said acid in said confined space to form a polyphase mixture which contains said gas and aqueous liquid, containing sodium alkyl benzene sulfonate resulting from the neutralization of said alkyl benzene sulfonic acid by sodium carbonate, spraying said polyphase mixture into a liquid-collecting chamber by utilizing the force of the autogenous pressure of carbon dioxide gas present in said mixture to effect the release of said carbon dioxide gas of neutralization, and collecting the sprayed particles at the bottom of said chamber in the form of an agglomerated, liquid, essentially defoamed slurry.

8. A continuous process of producing a magnesium salt of alkyl benzene sulfonic acid, which comprises neutralizing a liquid feed stream containing an alkyl benzene sulfonic acid, normally tending to form a gas-retaining stable foam, by mixing said feed stream with the stream of an aqueous suspension of magnesium carbonate in a confined space, while retaining carbon dioxide gas produced by the neutralization of said acid in said confined space to form a polyphase mixture which contains said gas and aqueous liquid, containing magnesium alkyl benzene sulfonate resulting from the neutralization of said alkyl benzene sulfonic acid by magnesium carbonate, spraying said polyphase mixture into a liquid-collecting chamber to effect the release of said carbon dioxide gas of neutralization, and collecting the sprayed particles at the bottom of said chamber in the form of an agglomerated, liquid, essentially defoamed slurry.

9. A continuous process of producing a mixture of sodium salts of alkyl benzene sulfonic and sulfuric acids, which comprises neutralizing a liquid feed stream containing a mixture of sulfuric and alkyl benzene sulfonic acids, said sulfonic acid normally tending to form a gas-retaining stable foam, by mixing said feed stream with a stream of an aqueous soltuion of sodium carbonate in a confined space, while retaining carbon dioxide gas produced by the neutralization of said mixture of acids in said confined space to form a polyphase mixture which contains said gas and aqueous liquid, containing sodium alkyl benzene sulfonate and sodium sulfate resulting from the neutralization of said mixture of acids, spraying said polyphase mixture into a liquid-collecting chamber by utilizing the force of the autogenous pressure of carbon dioxide gas present in said mixture to effect the release of said carbon dioxide gas of neutralization, and collecting the sprayed particles at the bottom of said chamber in the form of an agglomerated, liquid, essentially defoamed slurry.

10. A continuous process for producing sodium salts of alkyl benzene sulfonic acids, which comprises neutralizing a liquid feed stream containing an alkyl benzene sulfonic acid, normally tending to form a gas-retaining stable foam, by mixing said feed stream with a stream of aqueous solution of sodium carbonate in a confined space, while retaining carbon dioxide gas produced by neutralization of said alkyl benzene sulfonic acids in said confined space, to form a polyphase mixture which contains said gas and aqueous liquid, containing sodium alkyl benzene sulfonate resulting from the neutralization of said alkyl benzene sulfonic acid by sodium carbonate, and spraying said polyphase mixture into a collecting chamber by utilizing the force of the autogenous pressure of carbon dioxide gas present in said mixture prior to completion of the neutralization reaction.

11. A continuous process of producing surface-active salts of alkyl benzene sulfonic acid containing from 12 to 18 carbon atoms in the alkyl chain, which comprises neutralizing a liquid feed stream containing an alkyl benzene sulfonic acid having from 12 to 18 carbon atoms in the alkyl chain and normally tending to form a gas-retaining stable foam, by mixing said feed stream with a stream of an aqueous dispersion of an inorganic alkaline carbonate in a confined space, while retaining carbon dioxide gas produced by the neutralization of said acid in said confined space to form a polyphase mixture which contains said gas and aqueous liquid, containing the salt resulting from the neutralization of said alkyl benzene sulfonic acid by said inorganic alkaline carbonate, spraying said polyphase mixture into a liquid-collecting chamber by utilizing the force of the autogenous pressure of carbon dioxide gas present in said mixture to effect the release of said carbon dioxide gas of neutralization, and collecting the sprayed particles at the bottom of said chamber in the form of an agglomerated, liquid, essentially defoamed slurry.

12. A continuous process for the manufacture of a particulate, substantially dust-free surface-active product of neutralization of an organic sulfonic acid, which comprises neutralizing a liquid feed stream containing an organic surface-active sulfonic acid in a mixture with sulfuric acid, by mixing said feed stream with an aqueous dispersion of an inorganic alkaline carbonate in a confined zone while retaining the carbon dioxide gas produced by neutralization of said organic surface-active sulfonic acid and sulfuric acid in said confined zone to form a polyphase mixture of said carbon dioxide gas and of an aqueous liquid containing the salts resulting from the neutralization of said organic sulfonic and sulfuric acids by said inorganic alkaline carbonate; spraying said polyphase mixture into a liquid-collecting chamber by utilizing the force of the autogenous pressure of carbon dioxide gas present in said mixture to effect the release of said carbon dioxide gas; collecting the spray at the bottom of said chamber in the form of an agglomerated, liquid, essentially defoamed slurry; spray-drying said liquid slurry; and recovering solid, relatively uniform, dust-free particles comprising organic sulfonic acid salt and sulfate.

13. A process as defined in claim 1 wherein the aqueous dispersion of an inorganic alkaline carbonate is a dispersion of an alkali metal carbonate.

14. A process as defined in claim 1 wherein the aqueous dispersion of an inorganic alkaline carbonate is a dispersion of an alkaline earth metal carbonate.

15. A continuous process for producing surface-active salts of organic sulfonic acids, which comprises neutralizing a liquid feed stream containing an organic surface-active sulfonic acid in a mixture with sulfuric acid by mixing said feed stream with an aqueous dispersion of an inorganic alkaline carbonate in a confined space while retaining the carbon dioxide gas produced by neutralization of said organic surface-active sulfonic acid and sulfuric acid in said confined space to form a polyphase mixture of said carbon dioxide gas and of an aqueous liquid containing the salts resulting from the neutralization of said organic sulfonic and sulfuric acids by said inorganic alkaline carbonate; spraying said polyphase mixture into a liquid-collecting chamber by utilizing the force of the autogenous pressure of carbon dioxide gas present in said mixture to effect the release of said carbon dioxide gas; and collecting the spray at the bottom of said chamber in the form of an agglomerated, liquid, essentially defoamed slurry.

16. A continuous process for producing surface-active salts of organic sulfonic acids, which comprises neutralizing a liquid feed stream containing an organic surface-active sulfonic acid in a mixture with sulfuric acid by mixing said feed stream with an aqueous dispersion of an inorganic alkaline carbonate in a confined space while retaining carbon dioxide gas produced by neutralization of said organic surface-active sulfonic acid sulfuric acid in said confined space to form a polyphase mixture of said carbon dioxide gas and of an aqueous liquid containing the salts resulting from the neutralization of said organic sulfonic and sulfuric acids by said inorganic alkaline carbonate; and spraying said polyphase mixture into a liquid-collecting chamber by utilizing the force of the autogenous pressure of carbon dioxide gas present in said mixture prior to completion of the neutralization reaction.

DANIEL H. CONDIT.

REFERENCES CITED

The following references are of record in the file of this patent:

UNITED STATES PATENTS

| Number | Name | Date |
| --- | --- | --- |
| 1,737,792 | Gunther | Dec. 3, 1929 |
| 2,187,244 | Mills | Jan. 16, 1940 |
| 2,316,670 | Colgate | Apr. 13, 1943 |
| 2,325,320 | Holuba | July 27, 1943 |
| 2,422,128 | Percy | June 10, 1947 |
| 2,477,383 | Lewis | July 26, 1949 |